(12) United States Patent
Yeh

(10) Patent No.: US 9,117,075 B1
(45) Date of Patent: Aug. 25, 2015

(54) EARLY MALWARE DETECTION BY CROSS-REFERENCING HOST DATA

(75) Inventor: Anne Yeh, Taipei (TW)

(73) Assignee: Trend Micro Inc., Tokyo (JP)

( * ) Notice: Subject to any disclaimer, the term of this patent is extended or adjusted under 35 U.S.C. 154(b) by 743 days.

(21) Appl. No.: 12/951,785

(22) Filed: Nov. 22, 2010

(51) Int. Cl.
G06F 21/00 (2013.01)
G06F 21/56 (2013.01)
H04L 29/06 (2006.01)

(52) U.S. Cl.
CPC ............ *G06F 21/56* (2013.01); *H04L 63/145* (2013.01)

(58) Field of Classification Search
USPC .......................................................... 726/24
See application file for complete search history.

(56) References Cited

U.S. PATENT DOCUMENTS

| | | | | |
|---|---|---|---|---|
| 8,260,961 | B1 * | 9/2012 | Wilkinson et al. ............ | 709/245 |
| 2002/0194489 | A1 * | 12/2002 | Almogy et al. ............... | 713/200 |
| 2009/0083852 | A1 * | 3/2009 | Kuo et al. ..................... | 726/22 |
| 2010/0138931 | A1 * | 6/2010 | Thorley et al. ................ | 726/27 |

* cited by examiner

Primary Examiner — Lisa Lewis
Assistant Examiner — Maung Lwin
(74) Attorney, Agent, or Firm — Beyer Law Group LLP

(57) ABSTRACT

A computer network of an enterprise includes a central management computer linking at least one trusted host computer with at least one user computer. The trusted host computer is not used for normal day-to-day activities within the enterprise, and may also not be used for reading electronic mail nor for accessing the Internet and downloading Web site content. Antivirus software on the user computer screens for suspect activity or features and, if found, the suspect activity or features are compared to rules database. If a determination of malware cannot be made, then these unresolved activities or features are sent to the central management computer to be compared to the trusted, known activities and features of the trusted computer. The suspect activities may be deemed acceptable if activities are shared amongst a certain number of user computers all configured to perform the same function. A user computer may be compared against itself over time.

20 Claims, 9 Drawing Sheets

EARLY MALWARE DETECTION BY CROSS-REFERENCING HOST DATA

FIELD OF THE INVENTION

The present invention relates generally to malware detection. More specifically, the present invention relates to cross-referencing host data on a trusted enterprise host computer to compare to a suspect computer.

BACKGROUND OF THE INVENTION

Currently, computers are subject to malware attacks and considerable effort is expended in trying to prevent these attacks or to address them once they occur. One particular type of virus is known as the zero-day virus. A zero-day virus is a previously-unknown computer virus for which specific antivirus software signatures are not yet available. Because a signature is not yet available, the virus cannot be detected by software using virus patterns. Normally, antivirus software that relies upon signatures to identify malware can be effective, but cannot defend against malware unless samples have been obtained and updates distributed to users. Therefore, signature-based approaches are not effective against zero-day viruses.

Similarly, a zero-day (or zero-hour or day-zero) attack is malware that exploits computer application vulnerabilities that are unknown to the software developer. Zero-day attacks are used by attackers before the software developer knows about the vulnerability.

Techniques exist to limit the effectiveness of zero-day attacks. For example, the Microsoft operating system includes limited protection against generic memory corruption vulnerabilities. Another example is "multiple layers" that provides service-agnostic protection. Access control lists are implemented in the service itself, restricting network access via local server firewalls, and then protecting the entire network with a hardware firewall. The disadvantage is that network access can be restricted and an extra hardware device needed. The use of "port knocking" or single packet authorization daemons may provide effective protection against zero-day attacks in network services. These techniques, however, are not suitable for environments with a large number of users.

The use of white lists can protect against zero day attacks. White lists will only allow known good applications to access a system and so any unknown applications are not allowed access. Although the use of white lists can be effective against zero-day attacks, an application "known" to be good can in fact have vulnerabilities that were missed in testing. To increase protection, the use of white lists is often combined with the use of a blacklist of virus definitions, but this can be quite restrictive to the user.

Another method to avoid zero-day attacks from a user perspective is to wait for a lengthy period of time before upgrading to a new version of software. The idea is that later software revisions will fix software vulnerabilities. While this method avoids zero-day attacks that are discovered before the next software release, security holes in any software can be discovered at any time. Also, the user must forgo the new version of software for a period of time.

Given the importance of early threat detection without the use of pattern files, and the various drawbacks of prior art approaches, and improved technique is desired to detect zero-day malicious activities on enterprise host computers.

SUMMARY OF THE INVENTION

To achieve the foregoing, and in accordance with the purpose of the present invention, a computer system is disclosed that includes a known, trusted host computer whose activities, behaviors and features may be compared against suspect behaviors of a user computer.

In one embodiment, anomaly monitoring software on the user computer detects activities that, while not malware, are suspect. These activities are compared against a rules database on the user computer. If the behavior is unresolved, the behaviors are compared against any of a number of white lists and known good behavior on the trusted computer to determine if the activity matches that of the trusted computer. If there is no match, then a malware alert may be generated. Exceptions may be allowed for activities that do not match but are shared amongst a certain number of user computers that are peers or share a similar usage or purpose. The activities are more likely to be labeled as malware if the user computer is a rogue computer. The anomaly monitoring software includes network sniffers, any IDS, antivirus software, and other targeted protection software In a second embodiment, behavior on a first computer is anomalous and behavior on a second computer is anomalous, the behaviors even rising to the level of suspected of being caused by malware. A central management computer determines that both these behaviors are the same and that these behaviors are not shared with any behavior of a trusted computer. Nevertheless, if both the first and second computers perform a common service function within the enterprise, then it may be determined that no malware alert is necessary. On the other hand, if a large number of unmatched behaviors are found (on a single machine), then a malware alert may be generated.

In a third embodiment, it is determined that a common, unknown behavior is shared amongst numerous (user-configurable) computers within an enterprise. It is further determined that this same behavior is not shared with any behavior of the trusted computer. If the behavior does not match with any rule in an exception database and the behavior does not match with any white list on the trusted computer, then a determination is made that malware is present.

In a fourth embodiment, the activities, behaviors and features of a user computer are analyzed by anomaly monitoring software at a first point in time. It is determined which of these activities, behaviors and features are not in common with a trusted host computer. The user computer is then analyzed at numerous points in time over a period of time. If a certain percentage of these activities, behaviors and features remain the same over time, then a determination may be made that these are likely are benign or regular behavior of the user computer. Activities, behaviors and features that pop out from the normal and regular temporal activities, behaviors and features are considered suspicious.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The basic idea is that a computer system will include a known, trusted computer host against which cross-referencing can be performed. There are a variety of specific features and behaviors that can be used for measurement and other computers in the system can be compared against the trusted host to see what percentage of features or behaviors differ from the trusted host. Features and behaviors that are unknown, undetected or otherwise odd are flagged. Further, the percentage of features and behaviors of a suspect computer that do not match with the trusted host can be compared against percentages of other computers in the system. When there is an aberrant feature or unknown behavior on a computer, this information can be used to analyze the threat and to lower the rate of false positives when detecting zero-day attacks.

Features and behaviors on one computer that differ from the trusted host can be correlated across other computers in the system to find a trend. Or, features and behaviors on one computer can be compared against those same features and behaviors on that same computer over time in order to provide a time-based correlation. By sharing unknown features and behaviors across computers within an enterprise, the confidence associated with threat identification can be increased and false positives are lowered.

Block Diagrams

Figure 1:
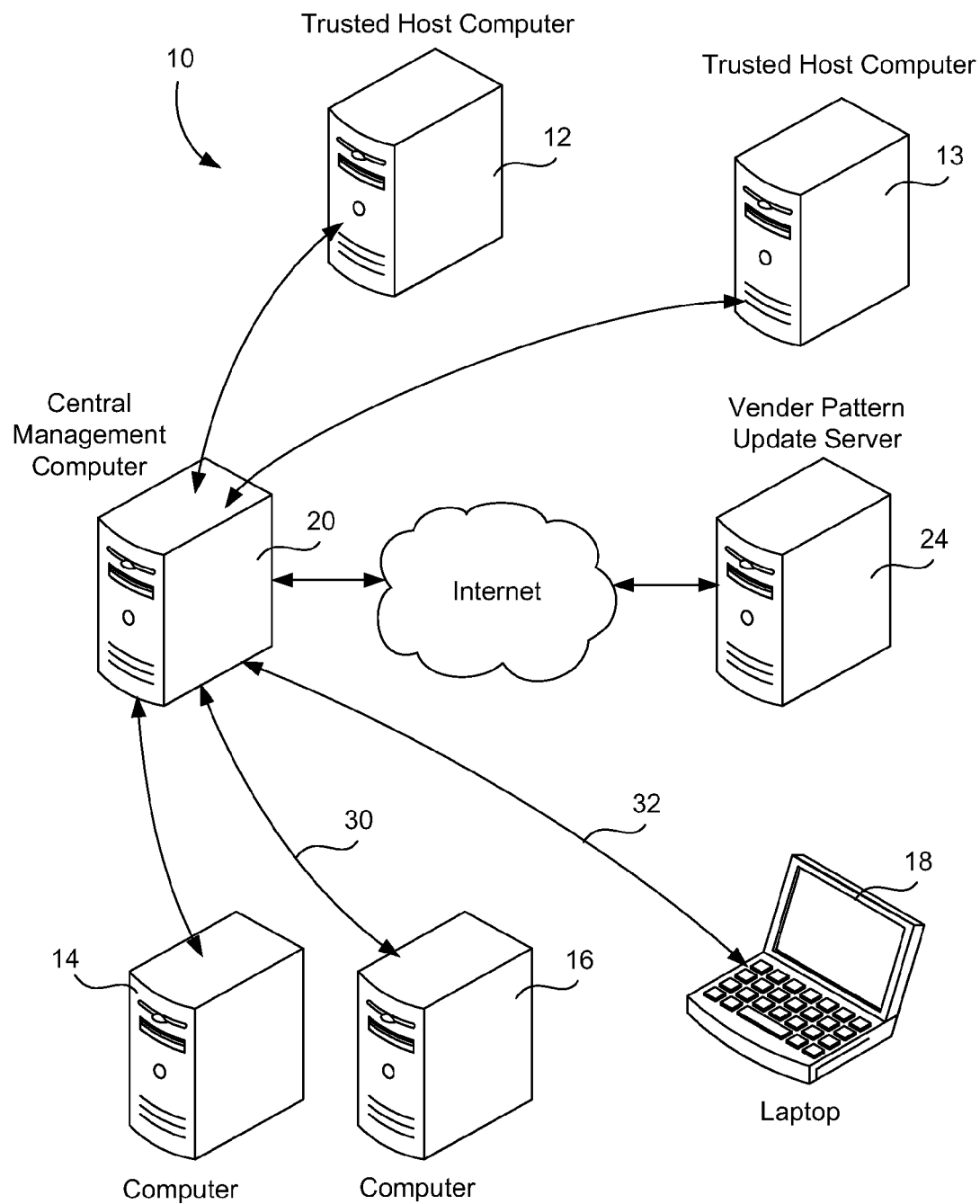
FIG. 1 illustrates a computer system within an enterprise for use with an embodiment of the invention.

FIG. 1 illustrates a computer system 10 within an enterprise for use with an embodiment of the invention. Included are trusted host computers 12 and 13, any number of user computers 14-18, and a central management computer 20. Trusted host computer 12 is a known, "good" computer with software that is kept malware free and updated with the latest antivirus software protection at all times. In one embodiment, host computer 12 is not used by users for normal day-to-day business of the enterprise, is not connected to the Internet, is not used by users for reading electronic mail, and is not used for peer-to-peer or network sharing. Alternatively, the computer 12 is connected to the Internet, but preferably should be on a different network than the one used for normal business operations. Furthermore, this computer is preferably maintained to have most up-to-date patches and virus patterns. And, even though this computer is not used in daily operations, it is set up and configured the same as the other user machines of the same nature.

Alternatively, the computer system 10 may be for a local business unit, instead of for an entire enterprise. In this embodiment, the invention allows for distributed management as the distributed nature allows for each business unit to have its version of white lists and allowed behavior. What might be considered normal in one location may be different from another; this distributed management thus allows for a more accurate description of what is allowed or normal in each local business unit.

The data, features and behaviors of this host computer will be compared against other computers within the system in order to determine if a possible zero-day attack is occurring on any of the other computers. In one embodiment, there are any number of trusted host computers each dedicated to a particular function within the enterprise. For example, while trusted computer 12 may be configured as a database server of the enterprise, trusted computer 13 may be configured as an e-mail server. Other types of trusted computers configured to mimic a function within the enterprise include: end user computers (IT, development, finance, administration), proxy servers, storage servers, source code build/management servers, and pattern update servers. Thus, if an actual database server within the corporation is suspected of having malware, its features and behaviors may be compared to the "gold standard" of trusted host computer 13 configured as a database server. Preferably, each trusted computer is a standalone hardware appliance that may take the form of a laptop computer, desktop computer, rack-mounted device, etc.

Figure 3:
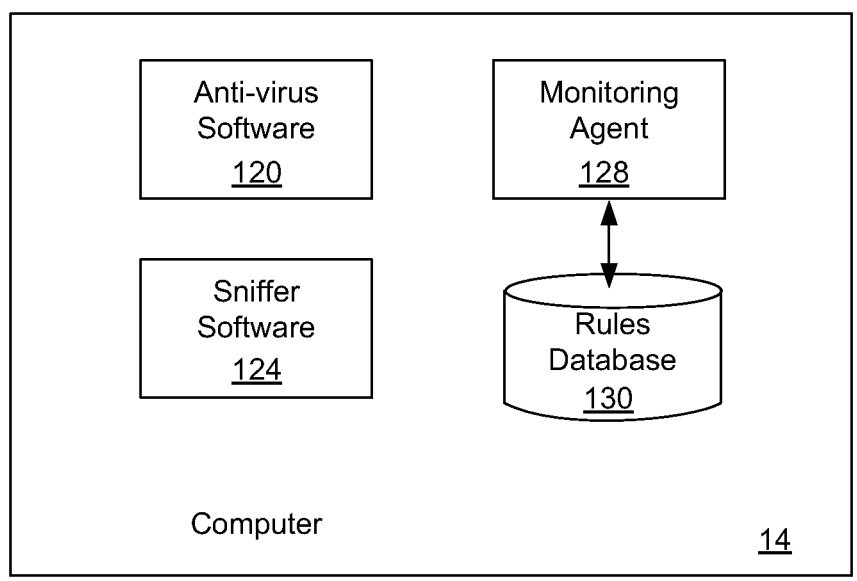
FIG. 3 is a block diagram of user computer.

Computers 14-18 are user computers or other system computers that run antivirus and other software continuously to monitor the activities of each computer. These computers are used for the normal day-to-day business of enterprise, may be accessed by users for routine activities, used for reading electronic mail, used for accessing the Internet to download information, etc. Each computer may be connected over a suitable network connection 30 to the management computer 20, such as an Ethernet connection, wireless connection or any other suitable network connection. These computers need not necessarily be linked hub-and-spoke to the management computer, but may be formed into network in any suitable fashion. Laptop computer 18 is an example of a portable computer within the network that may engage the network at various times and therefore be subject to malware detection by the invention described herein. Laptop computer 18 may also be an example of a rogue computer, that is, a computer that is not managed by the IT department of the corporation and does not necessarily have installed the monitoring agent 128 is shown in FIG. 3. As such, a rogue computer falls under greater suspicion if unknown features or behaviors are detected upon it.

The central management computer 20 runs application software to implement the present invention and is preferably in communication with each of the computers shown within the computer system. Its role is to gather data from the host and user computers, to correlate this data, and to issue alerts and other actions if a zero-day attack is detected. It is also responsible for periodically deploying updated rules (based on the latest correlation results) to each computer's rule database. Preferably, the management computer is its own hardware device and is connected via network connections to all host computers and user computers. All computers also have access over the Internet to a vendor pattern update server 24 that provides all antivirus patterns and updates, white lists, black lists, etc.

Not shown is sniffer software module 124 that typically would be placed upon a network device such as a router in order to capture network traffic data. This module captures information such as: any bad URLs accessed that were not reported by existing anti-phishing protection; various network protocol activities (FTP, SMTP, IRC, SMB, instant messaging, ports); IP-level packet statistics; port pings and pongs; and e-mail traffic. Sniffer software 124 may be any suitable software such as Snort, Tcpdump, Wireshark or Ourmon.

Figure 2:
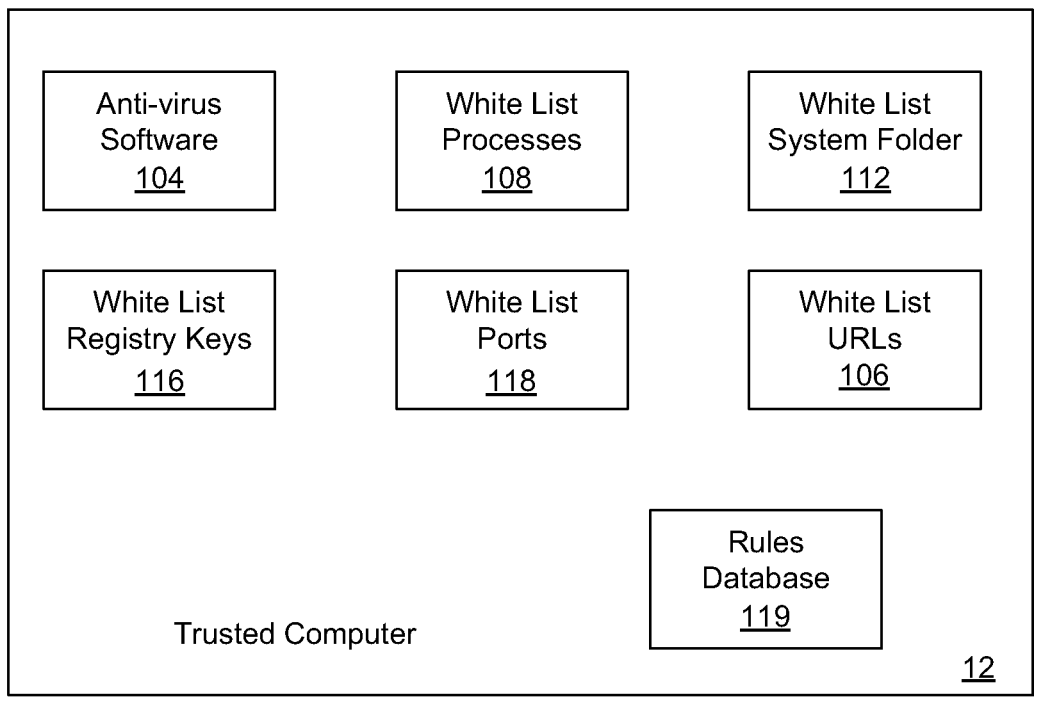
FIG. 2 is a block diagram of trusted computer.

FIG. 2 is a block diagram of trusted computer 12. Shown are software modules and databases that are additional to any normal hardware and software of the computer. Trusted computer 12 is a standalone computer having the software and databases implemented thereon. Preferably, Internet security protection software 104 is sophisticated, up-to-date software that uses at least pattern files and also reputation-based logic to protect the trusted computer. Examples of such software include antivirus, host firewall, and host and network IDSs. In addition, special watchdog software may be used to ensure that the trusted computer is not compromised by malware. Examples include an ACL-protected system service that ensures security software is always running, and monitors any unauthorized attempts to access system files, security files, or registry settings and files.

The trusted computer also includes a number of white lists 106-118 that indicate features allowed within the enterprise. For example, white list 106 includes particular URLs, domain names or other network addresses that user computers may contact from within the organization. White list 108 lists all processes (computer and network) that are allowed to run on any computer within the organization. White list 112 may contain the entire contents of important system folders such as the operating system folder, program files, the System32 folder, etc. Alternatively, this white list 112 may simply contain the hash values of files within particular important folder. This white list is valuable because malware may often modify, replace or add files into the system folder. The white list in this case also serves as a monitor list: once a snapshot has been taken, and unless changed by authorized updates, the values of these registry keys should not be modified. White list 116 includes values of important registry keys that malware often attempts to modify, such as Run, HKCU (HKLM) \Software\Microsoft\Internet Explorer\*, HKLM\Software\Microsoft\Windows NT\CurrentVersion\Winlogon\*, RunServices, RunOnce, RunOnceEx, Policies\Explorer\Run, HKLM\SOFTWARE\Classes\CLSID, and HKLM\SOFTWARE\Classes\PROTOCOLS. White list 118 includes port numbers that are acceptable for use within the network and can be trusted. Other white lists that may be included upon the trusted computer can be customized by a local security operator according to business regulatory rules.

A rules database 119 includes activities, behaviors, or other patterns of normal behavior that may occur within a user computer or over the network by the computer. For example, a typical rule might be "user logins are appropriate up until midnight." Alternatively, if rules database 170 of management computer 20 stores all the rules for each type of trusted computer, then database 119 is not needed.

Preferably, this trusted computer is running the latest version of any suitable Internet security protection software 104 such as antivirus, host/network IDS, host firewall, spyware detection, etc. The protection software should be up to date and running the latest version, as well as have installed the latest virus patterns. The operating system of this computer will have the latest updates, as well as any needed software patches. In addition, any URLs accessed must be good, i.e., the URL must be on the white list. If the trusted computer will not be used for day-to-day Internet activities, it may not be necessary to compare URLs.

FIG. 3 is a block diagram of user computer 14. Shown are software modules in addition to any normal hardware and software of the computer. Computer 14 is an example of a standalone computer within the enterprise such as a user computer, a server computer, or any other computing device that the enterprise wishes to cross-reference against trusted computer 12. A user computer will typically be used for performing routine tasks within the organization by a user, reading electronic mail, accessing the Internet, etc. Preferably, the antivirus software 120 running on computer 14 performs information collection as well as checking for viruses on the computer. The information collected for later comparison with the trusted computer includes: whether the computer is up-to-date on virus patterns; when the pattern was last updated successfully; when was the last time a scan was done; when was the last time this computer was infected by malware; has there been any attempt to shut down the antivirus software; which process attempted to shut down the antivirus software; when was the last virus scan performed, and heartbeat information for the software. Antivirus software 120 need not be the same as the antivirus software on the trusted computer but typically should include: a virus scanner, a firewall, Web protection, URL scanning, Internet security, etc.

Also included on computer 14 is monitoring agent software 128 that has the ability to monitor processes, registry keys, system alerts, etc. Agent 128 collects information such as: the function of this computer; does the computer include a database server; does this computer run any Web services; is this a proxy server; have any failures or alerts been reported in the event log; have any unusual files been dropped into System32; have any unusual DLLs been loaded by svchost; is there any application software with a new patch available but not yet applied; which are new the programs installed, which registry keys were modified, which libraries are loaded by known executables, etc. Agent 128 also has the ability to log information such as: process launches, file path names of launched processes, attempts to update or delete Registry keys, URL accesses, browsing history, network access, etc. Agent 128 maybe implemented using any suitable software but is preferably implemented as a Microsoft operating system service.

Also included within each user computer as part of the monitoring agent (or separately) is a rules database 130. Database 130 includes rules that have been downloaded from the central computer 20 and describe behaviors of the user computer that are allowed and those behaviors that are not allowed. Examples include: a user may log in to the system between the hours of 8 a.m. and 8 p.m.; opening of shared network folders is not allowed; and removable devices (e.g., a USB drive) must be scanned with antivirus software before its content is accessible.

Figure 4:
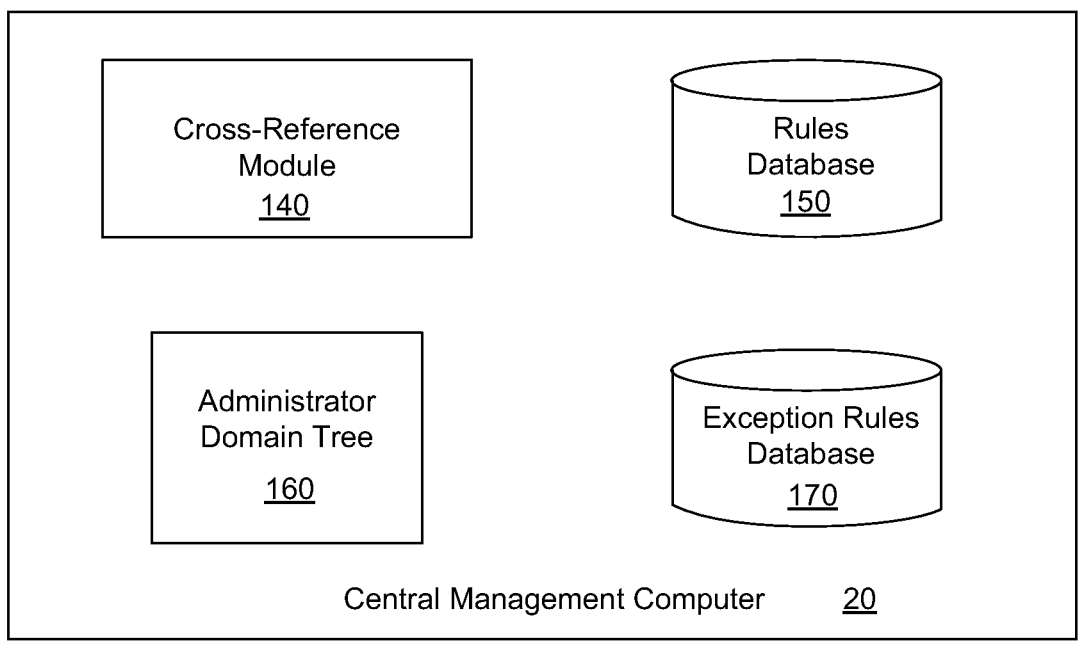
FIG. 4 is a block diagram of central management computer.

FIG. 4 is a block diagram of central management computer 20. Shown are software modules in addition to a normal hardware and software of the computer. Central management computer 20 may be a standalone hardware device arranged to run the software within cross-reference module 140, or cross-reference module 140 may run on any other suitable computer. The purpose of cross-reference module 140 is to gather data previously described in the software modules and agents of the computers within the system and to correlate this information with the known, good information from trusted host computer 12. The module 140 will then be in a position to issue alerts, recommendations or other actions. Also included is a rules database 150 that includes rules to be downloaded by each user computer to database 130 laying out which are allowed behaviors and which are not.

Typically, such a management computer also includes an administrator domain tree 160 to keep track of the known corporate computers within the network.

Scenarios

In the below scenarios, an "unknown activity" refers to an activity or behavior that existing antivirus software fails to identify. For example, if a process loads a new DLL or there is network activity through an undocumented port, that would qualify as an unknown activity. Other examples include: an increase in UDP packets sent in a short time period; an update to System32 folder files outside of a scheduled or known software patch time; and a non-DHCP server experiencing a lot of network traffic on port 25. An activity or program that antivirus software labels definitely as "malware" would not fall in the category of "unknown activity" because the antivirus software has been able to conclude that malware is definitely present. In addition to an unknown activity, there may be features of a given computer that are unknown or suspect.

For example, features that are logged by each monitoring agent for cross-reference to the trusted computer include: port access; URL and domain access; antivirus software pattern number; running processes; contents of important registry keys, contents of important system folders; event log alerts; software patches; remote machine access; and system performance measures including startup time, program launch time, and memory footprint of known services and applications. It is anticipated that all computers within a system of enterprise will share a certain percentage of behaviors with the trusted computer and will share certain percentage of features with the trusted computer as well. If that percentage becomes too low or if other factors are present, then it is possible that malware is present on the computer.

Figure 5:
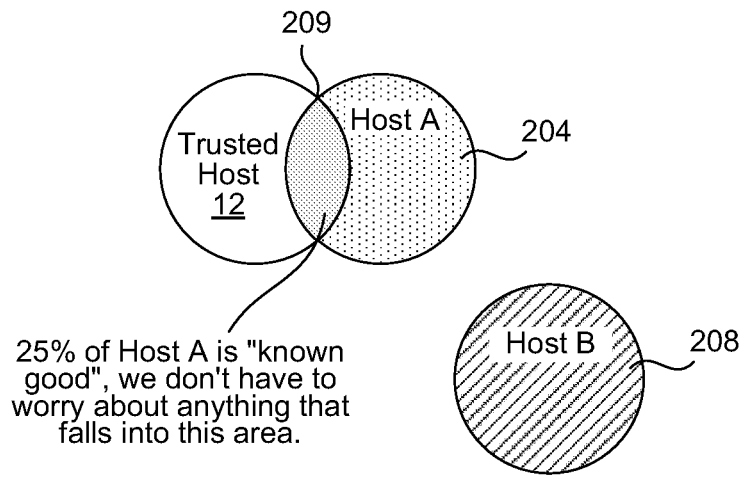
FIG. 5 is a Venn diagram showing trusted computer and two other computers.

FIG. 5 is a Venn diagram showing trusted computer 12 and two other computers, namely 204 and 208. Computer 208 is a rogue computer. Region 209 shows that 25% of the activities and features of computer 204 are in common with the trusted computer; these activities should be of no concern. But, 75% of the activities and features of computer 204 are subject to further scrutiny because they are not shared with the trusted computer. The monitoring agent will use its rules database to make a decision as to whether these activities and features are caused by malware. In this example, computer 208 is a portable device that has been newly introduced into the system. Because it has nothing in common with the trusted computer, the features and activities of computer 208 are suspect.

An example of system operation is as follows. Consider a malware detection system rule "analyze activity if a *.exe is transferred, originating from a non-trusted computer after 6 pm." This activity will be captured by the network IPS and reported to the central management computer. A cross-reference module on the central management computer will make the following assessment "for computer 204, the target folder in which the file is copied to and the filename of the *.exe is within region 209" and will make the following decision "this is a valid activity, but log this incident in the audit log." But, if a file is transferred from computer 208, the central management computer will decide that computer 208 is a rouge computer and will make a decision that this is invalid activity and generate an alert.

Figure 6:
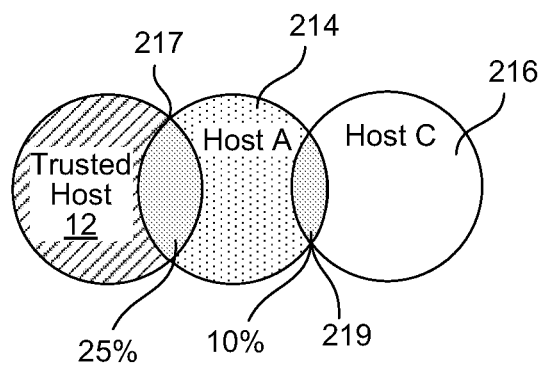
FIG. 6 is a Venn diagram showing trusted computer and two other computers.

FIG. 6 is a Venn diagram showing trusted computer 12, computer 214 and computer 216. In this example, region 217 indicates that 25% of the activities and features of computer 214 are in common with the trusted computer. But, 75% of these activities and features are not in common with the trusted computer and, moreover, 10% of these suspect activities and features (region 219) are also shared with computer 216. Because computer 216 is a rogue computer, it is highly likely that the activities and features of region 219 indicate malware. The rules database of the monitoring agent will then be able to flag the activities and features of this region as being suspect and it is likely that a malware alert will be generated.

An example of system operation is as follows. Consider a malware detection system rule "analyze activity if a *.exe is transferred, originating from a non-trusted computer after 6 pm." Consider that this rule is triggered twice for computer 214: once for file "a.exe" and once for file "b.exe" at different times and to different locations. The cross-reference module assessment is as follows. Concerning computer 214, since file a.exe is within region 217, allow the activity but log the incident in an audit log. But, file b.exe is not within region 217; it is in region 219. The decision would then be to generate an alert that computer 214 may be compromised by rogue machine 216.

Figure 7:
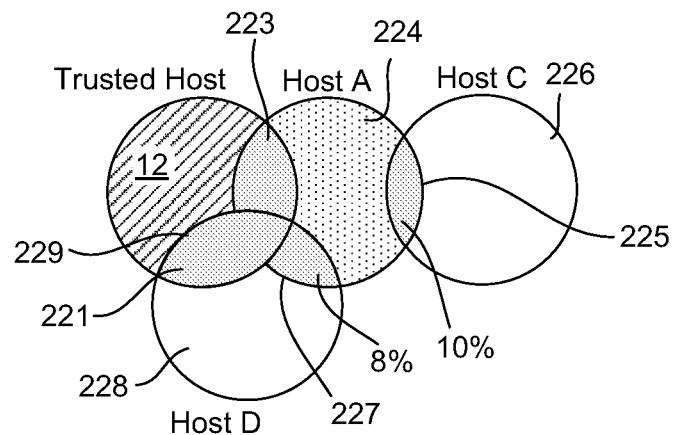
FIG. 7 is a Venn diagram showing trusted computer and three other computers.

FIG. 7 is a Venn diagram showing trusted computer 12 and computers 224, 226 and 228. As mentioned above, it appears that computer 224 and computer 226 are both affected by malware because region 225 indicates that both computers share activities and features that are not in common with the trusted computer. In addition, region 227 indicates that both computers 224 and 228 share common activities and features that are not in common with the trusted computer. It is also possible that region 227 indicates activities and features that are caused by malware, although a mitigating factor is that computers 224 and 228 have a large percentage in common with the trusted computer and are therefore partially trusted. Therefore, in order to avoid false positives, a rule would likely conclude that the features and behaviors of region 227 should be trusted.

An example of system operation is as follows. Consider a malware detection system rule "analyze activity if an executable file is downloaded from an FTP site." If this activity occurs, it will be captured by the network IPS and sent to the central management computer. Consider that: computer 224 downloads files a.exe, b.exe, c.exe, and d.exe; computer 228 downloads files b.exe, c.exe, and f.exe; and that computer 226 downloads file d.exe. The cross-reference module assessment is as follows. For computer 224, since a.exe is within region 223 (the file name is a known patch update file recently deployed onto computer 12, the decision is that this is a valid activity. Since file b.exe is within region 227 and computers 224 and 228 are not similar in function, the decision is that this is an invalid activity, and an alert is generated that names both computers 224 and 228 as offenders. Since file c.exe is within region 229 the decision is that this is a valid activity. Since file d.exe is within region 225 the decision is that this is an invalid activity, and an alert is generated. For computer 228, since file b.exe is within region 227 decide that this is invalid activity, log it, but do not generate an alert since an alert was already generated for computer 228. Since file c.exe is within region 229 the activity should be allowed. Since file f.exe is within region 221 allow the activity but log it in an audit log.

Figure 8:
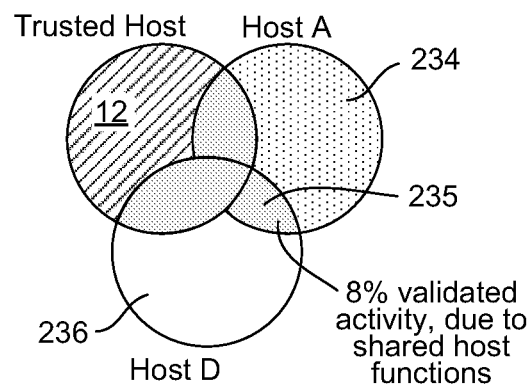
FIG. 8 is a Venn diagram showing trusted computer and two system computers.

FIG. 8 is a Venn diagram showing trusted computer 12 and two system computers 234 and 236. Region 235 indicates that 8% of the activity shared between computers 234 and 236 is not shared with the trusted computer. Normally, this region would be cause for suspicion. But, in this example, each computer supplies Web services (as reported by their respective monitoring agents). In addition, the network traffic reveals that the unknown activities are related to known ports used by the Web services. Thus, the monitoring agent may safely deduce that these unknown activities are not malicious and should be validated. In general, if two suspects computers are of the same type, i.e., both are administrators or both are development machines, then their unknown activities or more likely to be trusted.

An example of system operation is as follows. Consider a malware detection system rule "analyze activity if an executable file is downloaded from an FTP site." If this activity occurs, it will be captured by the network IPS and sent to the central management computer. Consider that: computer 234 downloads files a.exe, b.exe, and c.exe; and that computer 236 downloads files b.exe, c.exe, and f.exe. The cross-reference module assessment is the same as above for regions other than 235. For region 235 (file b.exe), since computers 234 and 235 are of the same type, the analysis is that the activity is benign and no alert should be generated, but should be logged to audit log.

Figure 9:
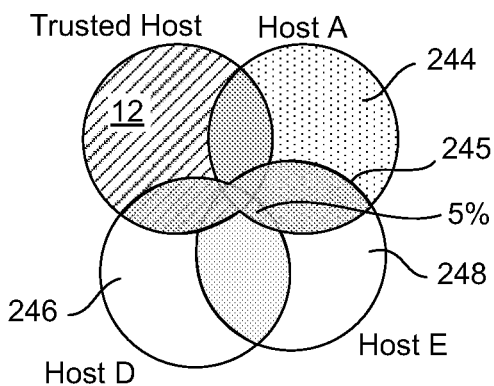
FIG. 9 is a Venn diagram showing trusted computer and three enterprise computers.

FIG. 9 is a Venn diagram showing trusted computer 12 and enterprise computers 244, 246 and 248. Region 245 indicates that 5% of the activity and features of these three computers are not in common with the trusted computer. In this example, none of computers 244-248 are rogue computers, but they all have unknown activities occurring. Because these unknown activities are shared between three computers, we have good confidence that these activities are malicious. The fact that these activities are present on more than two computers is a strong indicator of the presence of a threat on these computers. The greater the number of system computers sharing the same unknown activities increases our confidence level in the presence of a threat. Even though these computers share some features and behaviors with the trusted computer the amount in common is not a huge percentage.

Figure 10:
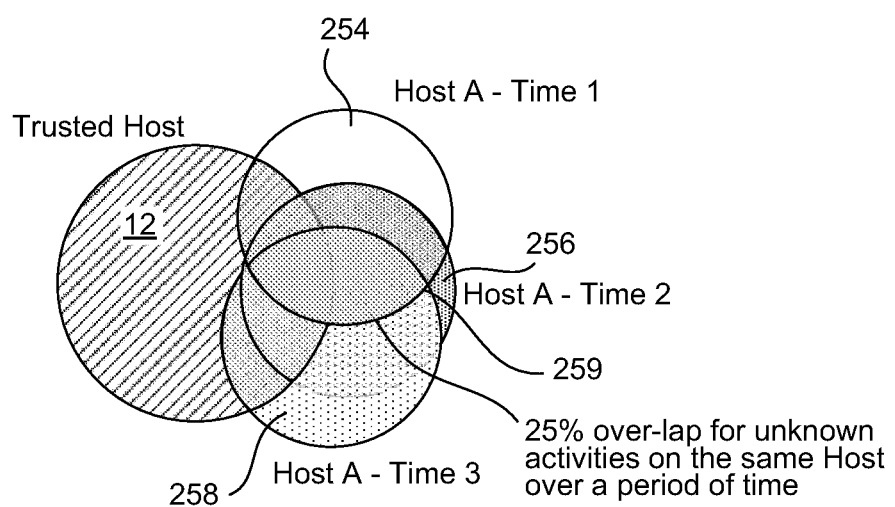
FIG. 10 is a Venn diagram showing trusted computer and a single user computer over time, shown as three computers.

FIG. 10 is a Venn diagram showing trusted computer 12 and a single user computer over time, shown as user computer 254, 256 and 258. As shown, the percentage of activities and features in common with the trusted host computer does change over time. What is clear, though, is that region 259 indicates that 25% of the activities and features occur on the same computer over time, and that these activities and features are unknown. By correlating activities detected on the same computer over time, we can increase our confidence of a possible threat even on a single computer by realizing that 25% of these activities and features are unknown and are constant over time.

An example of system operation is as follows. Consider a malware detection system rule "generate an alert if the user logs in after 10 p.m." The assessment is that since this activity is local to the machine (there is no network file transfer nor accessing of URL's) and it is a regular activity for the user, treat it as a valid activity.

Flow Diagrams

Figure 11:
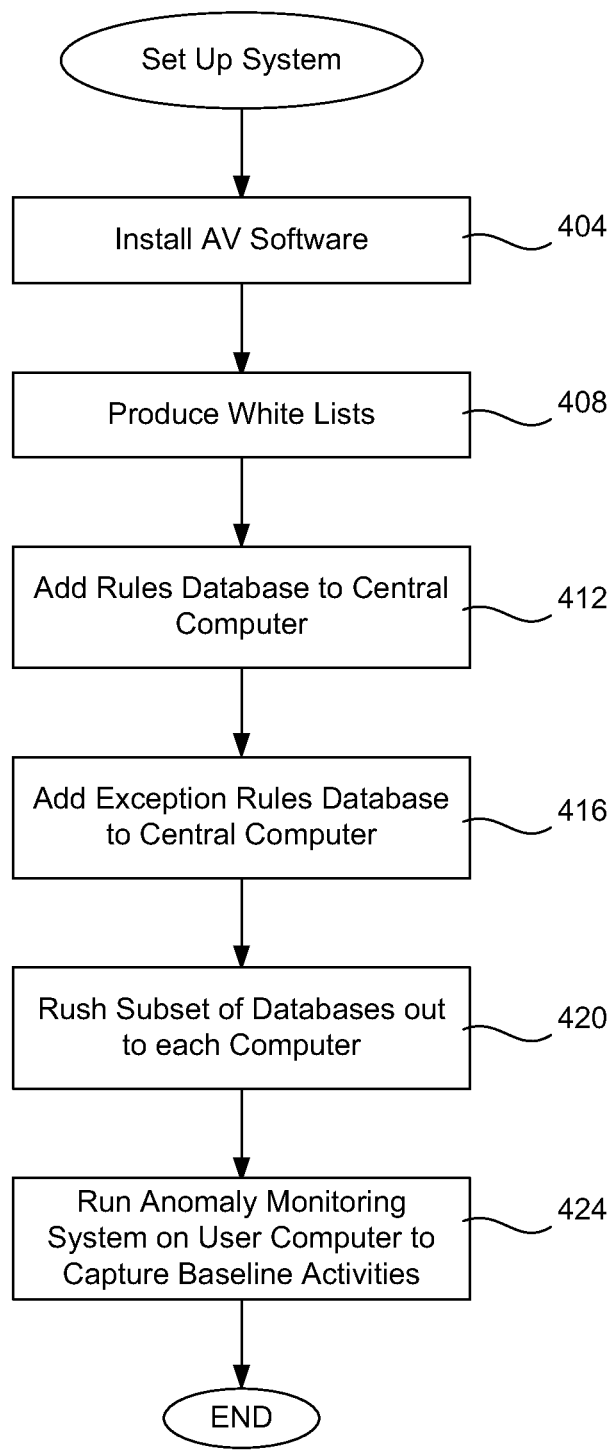
FIG. 11 is a flow diagram describing activities used to set up the present invention.

FIG. 11 is a flow diagram describing activities used to set up the present invention. In step 404 the protection software 104 and 120 is installed and updated on the trusted computer and user computers, respectively. In step 408 the various white lists are produced (or downloaded from update server 24) and stored on the trusted computer 12. In step 412 the rules database 150 is populated with rules indicating when unknown behavior on the user computers is malware. The rules may also be configured by the system administrator or imported from other products (such as Snort). This activity is routinely performed to update the rules database.

In step 416 any exception rules are added to the exception rules database 170 on the central computer. These exception rules provide exceptions to the rules of rules database 150 that conclude when unknown behavior is indicative of malware. For example, FIG. 8 shows two computers 234 and 236 whose behaviors 235 would otherwise be classified as malware except for the fact that these two computers are performing the same function, i.e., Web services. An example of an exception rule would then be: "if shared behavior is unknown but the computers sharing this behavior perform the same function then do not raise a malware alert." Examples of other exception rules include: if behavior is unknown, but the user has been granted elevated privileges (he is a CSO, a DB administrator, etc), then do not raise an alert; if the behavior is unknown, but the asset type of the computer is marked to perform certain business functions (e.g., it is an IT pattern update server), then do not raise an alert. In step 420 a subset of these rules from databases 150 and 170 are pushed down to each computer 14 and stored within its rules database 130 for use by the monitoring agent 128. Step 424 runs the anomaly monitoring system on each user machine to capture baseline activities for later comparison.

Figure 12:
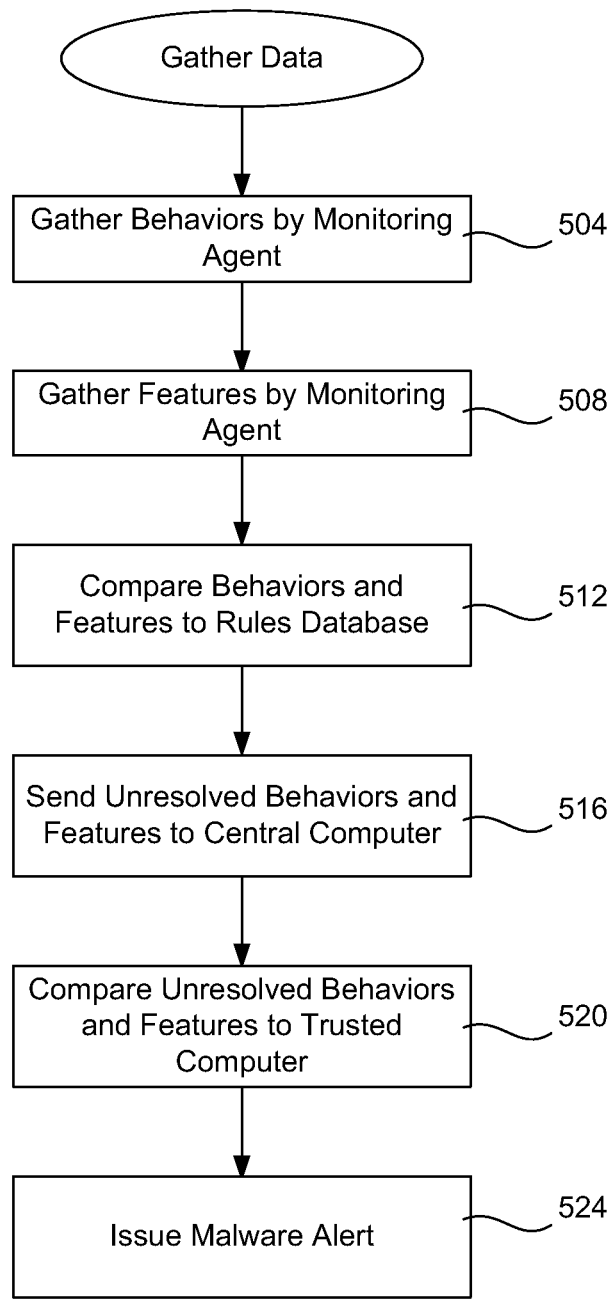
FIG. 12 is a flow diagram describing how the features and behaviors of a user computer are compared to the trusted computer.

FIG. 12 is a flow diagram describing how the features and behaviors of a user computer are compared to the trusted computer. In step 504 the current activities and behaviors exhibited by the user computer are gathered by monitoring agent 128. Examples of behaviors that may be gathered include: user login time, user-launched programs, and user Internet activities. In step 508 the current features exhibited by the user computer are gathered by monitoring agent 128. Examples of features that may be gathered include: DLL's loaded by programs, computer startup time, program launch time delay, and CPU/memory usage.

In step 512 these gathered behaviors and features are compared to the rules database 130 in order to determine if: a malware alert should be issued; if no action should be taken; or, if there are unresolved behaviors and features should be sent up to the central computer. For example, if a feature of a user computer is unknown, or if an observed behavior tends to indicate malware, then this feature or behavior may be sent to the central computer for further comparison with the trusted computer. Examples rules that would lead to each of the three types of actions include: if the protection program on a machine terminates unexpectedly over N times within H hours then issue an alert; and if c:/foo/a.exe is modified (file c:/foo/a.exe is updated at time T), the activity is allowed because it is a software patch deployment and no action is taken. This last rule is preferably added to the central computer and pushed down to the local rules collection before the patch deployment. Finally, if there is an FTP connection to an unknown IP address then the behavior is unresolved. In general, if a rule indicates malware, then the information will be sent to the central computer.

In step 516 any unresolved features or behaviors (i.e., if it cannot be determined whether to definitely issue a malware alert or definitely conclude that no malware is present) are sent from the user computer up to the central management computer 20. In step 520 correlation occurs as the unresolved features and behaviors are compared at the central computer against the trusted computer. In this step, any of the various white lists of the trusted computer are downloaded, accessed or their information is otherwise obtained in order to compare the white list information against a feature or behavior of the suspect user computer. For example, a URL whitelist is updated on the central computer. The detected behavior is a connection to a URL that is in the updated whitelist, but not yet in the local machine's whitelist. By downloading the updated whitelist from the central computer, the behavior will not trigger an alert.

Unknown behavior detected on the user computer may be compared to the trusted computer in different ways. For example, either the user's behavior (user-launched programs, user-initiated file downloads, etc.) or features of the machine (e.g., DLL's loaded by a process) may be considered behavior. If explorer.exe is detected loading "a.dll" on the local machine, but explorer.exe on the trusted computer does not load "a.dll" then the comparison indicates that the user computer behavior is suspicious.

If, in step 520 one of the unknown features or behaviors matches with one of the items in the white list on the trusted computer, then it is concluded that the unknown feature or behavior is acceptable and no malware alert is issued. But, if there is no match, then a malware alert is issued in step 524. Other actions that may be taken in step 524 include (depending on the severity of the offense): add the user machine to the network firewall's block list; push down (from the central computer) a tool and run it on the user machine; and lock the user account.

Computer System Embodiment

Figure 13A:
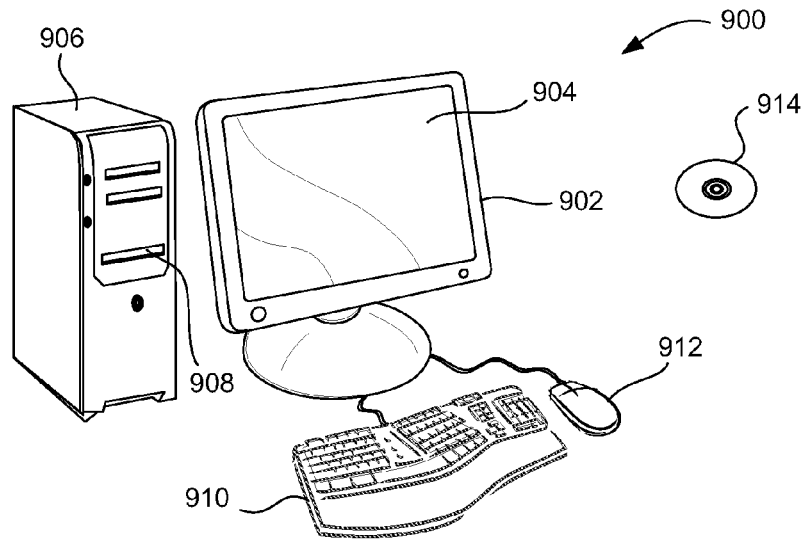
FIGS. 13A and 13B illustrate a computer system suitable for implementing embodiments of the present invention.
Figure 13B:
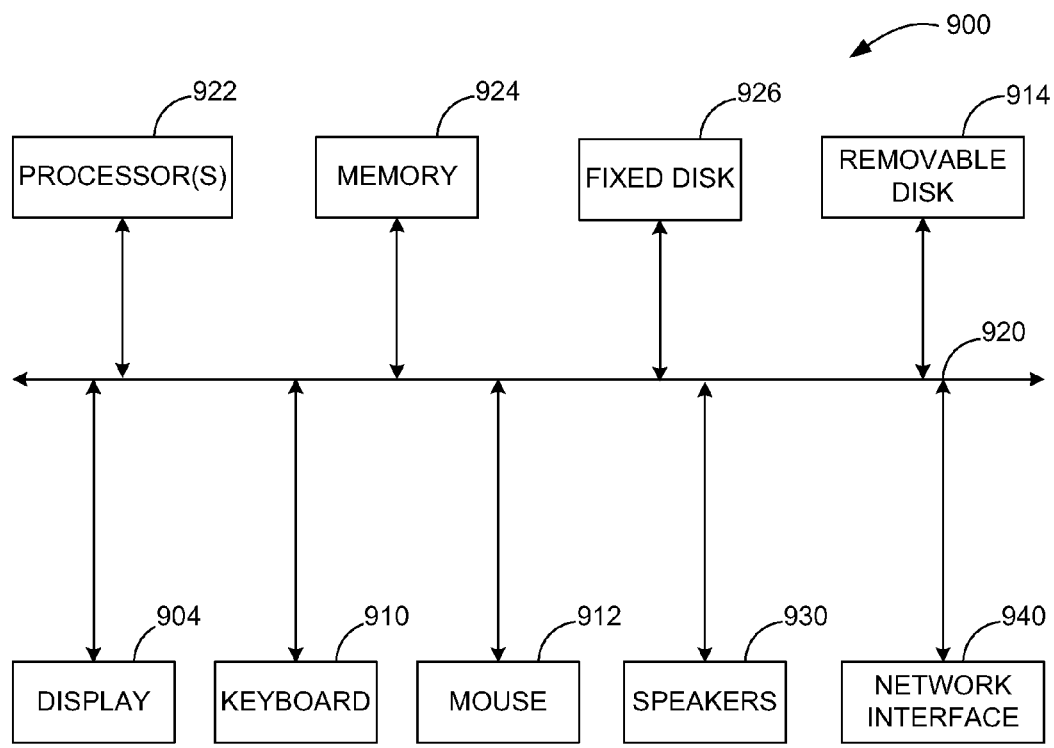

FIGS. 13A and 13B illustrate a computer system 900 suitable for implementing embodiments of the present invention. FIG. 13A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 13B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting malware, said method comprising:
    determining that a first behavior of a first computer within an enterprise is suspected of being caused by malware;
    determining that a second behavior of a second computer within said enterprise is suspected of being caused by malware;
    determining, by a central management computer, that said first and second behaviors are the same and that said behaviors are not shared with any behavior of a trusted computer by comparing said behaviors to behaviors of said trusted computer, said trusted computer being a computer within said enterprise and being malware free;
    determining, by said central management computer, that said first and second computers are both configured to be Web servers, both configured to be database servers, both configured to be e-mail servers, both configured to be proxy servers, both configured to be storage servers, both configured to be source code servers, or are both configured to be pattern update servers and provide a same common service function within said enterprise; and
    not issuing a malware alert because of said determining that said first and second computers provide said common service function even though said behaviors on said first and second computers are not shared with said trusted computer.

2. A method as recited in claim 1 further comprising:
    determining that said first and second behaviors are caused by malware when said first behavior does not match with a white list on said trusted computer; and
    issuing a malware alert.

3. A method as recited in claim 1 further comprising:
    determining that said first behavior is not caused by malware when said first behavior matches with a white list on said trusted computer; and allowing said first behavior on said first computer to continue.

4. A method as recited in claim 1 further comprising:
determining that said first and second behaviors are not caused by malware; and
allowing said behaviors on said first and second computers to continue.

5. A method as recited in claim 1 wherein one of said first or second computers is a rogue computer that is not managed by said enterprise, said method further comprising:
determining that said behaviors are indicative of malware; and
issuing a malware alert.

6. A method as recited in claim 1 wherein said service function is a Web service.

7. A method as recited in claim 1 wherein said service function is a database service.

8. A method as recited in claim 1 wherein said first and second computers are configured as end user computers and wherein said trusted computer is also configured as an end user computer.

9. A method as recited in claim 1 wherein said comparing said behaviors includes comparing said behaviors to at least one white list of said trusted computer.

10. A method as recited in claim 1 wherein said comparing said behaviors includes comparing DLLs loaded by a process of said first and second computers with DLLs loaded by a process of said trusted computer.

11. A method as recited in claim 1 further comprising:
determining, by said central management computer, whether said first and second computers are both configured to provide said same common service function within said enterprise;
not issuing a malware alert when it is determined that said first and second computers provide said same common service function even though said behaviors on said first and second computers are not shared with said trusted computer; and
issuing a malware alert when it is determined that said first and second computers do not provide said same common service function.

12. A method of detecting malware, said method comprising:
determining that a first behavior of a first computer within an enterprise is suspected of being caused by malware;
determining that a second behavior of a second computer within said enterprise is suspected of being caused by malware;
determining that a third behavior of a third computer within said enterprise is suspected of being caused by malware;
determining, by a central management computer, that said first, second and third behaviors are the same and that said behaviors are not shared with any behavior of a trusted computer by comparing said behaviors to behaviors of said trusted computer, said trusted computer being a computer within said enterprise and being malware free; and
determining, by said central management computer, that said first, second and third computers all are configured to be Web servers, all configured to be database servers, all configured to be e-mail servers, all configured to be proxy servers, all configured to be storage servers, all configured to be source code servers, or are all configured to be pattern update servers and provide a same common service function within said enterprise;
not issuing a malware alert because of said determining that said first, second and third computers provide said common service function even though said behaviors on said first, second and third computers are not shared with said trusted computer.

13. A method as recited in claim 12 further comprising:
determining that said behaviors do not match with any white lists on said trusted computer.

14. A method as recited in claim 12 further comprising
comparing said first behavior to an exception rules database; and
determining that said first behavior does not match with any rule in said exception rules database.

15. A method as recited in claim 12 further comprising:
determining that said first behavior is suspected of being caused by malware when antivirus software of said first computer cannot identify said first behavior.

16. A method as recited in claim 12 wherein one of said first, second or third computers is a rogue computer that is not managed by said enterprise.

17. A method as recited in claim 12 wherein said first, second and third computers are configured as end user computers and wherein said trusted computer is also configured as an end user computer.

18. A method as recited in claim 12 wherein said comparing said behaviors includes comparing said behaviors to at least one white list of said trusted computer.

19. A method as recited in claim 12 wherein said comparing said behaviors includes comparing DLLs loaded by a process of said first, second and third computers with DLLs loaded by a process of said trusted computer.

20. A method as recited in claim 12 further comprising:
determining, by said central management computer, whether said first, second and third computers are all configured to provide said same common service function within said enterprise;
not issuing a malware alert when it is determined that said first, second and third computers provide said same common service function even though said behaviors on said first, second and third computers are not shared with said trusted computer; and
issuing a malware alert when it is determined that said first, second and third computers do not provide said same common service function.

* * * * *